United States Patent Office 3,432,438
Patented Mar. 11, 1969

3,432,438
REDUCING ACID AQUEOUS MEDIUMS CONTAINING BIVALENT TIN CHELATES
Horst G. Langer, Cochituate, Mass., assignor to The Dow Chemical Company, Midland, Mich., a corporation of Delaware
No Drawing. Continuation of application Ser. No. 341,113, Jan. 29, 1964. This application May 5, 1967, Ser. No. 636,547
U.S. Cl. 252—188    7 Claims
Int. Cl. C09k 3/00

ABSTRACT OF THE DISCLOSURE

A reducing acid aqueous medium useful for organic reductions which includes a bivalent tin chelate reactable with water to generate hydrogen, said bivalent tin chelate being in acid form.

---

This is a continuation of application Ser. No. 341,113, filed Jan. 29, 1964, now abandoned.

This invention relates to oxidation-reduction reagents and, in particular, to a mild reaction system employing a stannous reducing agent by means of which water can be reduced to produce hydrogen, and organic chemicals can be reduced under very mild and specific conditions.

In chemical operations, there are a great many reactions by means of which hydrogen can be produced. Acid-metal reactions are perhaps the most familiar and a number of these have found their application in systems where nascent hydrogen is needed. For example, the reaction of zinc dust with an acid is perhaps the most common. In general, hydrogen is needed for a large number of reactions, because where the hydrogen is being produced, it is often needed in the medium for reaction with another compound. Where the conditions are such that decomposition of the compound will result, the reaction, of course, offers difficulty.

It is a basic object of this invention to provide a simple system by means of which water can be reduced to produce hydrogen gas.

It is another object of this invention to provide a system by which water can be reduced by tin and, further, the tin is complexed so that it does not interfere with the completion of the reaction. It is another object of the invention to provide a system in which organic reduction reactions can be carried out under mild conditions.

Other objects and advantages of the invention will in part be obvious and in part appear hereinafter.

This invention is concerned with a system involving the chemical reaction of a stannous chelate of a polyalkylene polyamine polyacetic acid compound with water or in a slightly acidified water solution to develop hydrogen gas, the ions being oxidized and then chelated by means of the liberated chelating agent. In the use of this simple system, I take advantage of the fact that simple tin compounds in which tin has the valence II are well-known, useful, and efficient reducing agents, but none of the simple stannous compounds known has been reported as having a reduction potential high enough to reduce water to produce hydrogen gas.

Polarographic measurements give halfwave potentials as follows:

Sn$^{++}$——$-0.45$ volt
Sn(II$_2$Y)
CaSn(II)Y }  at $-0.55$ volt; $-0.9$ volt
Na$_2$Sn(II)Y—merged with the hydrogen discharge; more negative than $-1.3$ volts.

Wherein Y is the chelating moiety, polyalkylene polyamine polyacetic acid compound, e.g., ethylene diamine tetraacetic acid.

In accordance with this invention, I use a tin chelate of the following general formula:

$$\begin{array}{c} HOOCCH_2 \quad\quad CH_2COOH \\ N-(CH_2)_n-N \\ CH_2 \quad\quad CH_2 \\ \quad\; Sn \\ O=C-O \quad\; O-C=O \end{array}$$

wherein $n$ has a value of 2–3–4. More generally it may be stated as $$\begin{array}{c} O \\ \parallel \\ O-C-CH_2 \\ Sn \quad\quad N-R \\ O-C-CH_2 \\ \parallel \\ O \end{array}$$

wherein R is developed as $$\left[ -(CH_2CH_2)-N-\!\!\!\!-CH_2COOH \atop CH_2COOH \right]_x$$

$$\begin{array}{c} HOOCCH_2 \\ N-CH_2CH_2-N-[(CH_2CH_2)-N-\!\!\!\!-CH_2COOH]_x \\ \quad\quad\quad\quad\quad\quad\quad\quad\; CH_2COOH \\ CH_2 \quad\quad CH_2 \\ \;\;\, Sn \\ O=C-O \quad O-C=O \end{array}$$

wherein x may be 0, 1, 2, 3. And the compound may be a chelate of imino diacetic acid, nitrilo triacetic acid, N-substituted iminodiacetic acid, ethylene diamine tetraacetic acid, diethylene triamine pentacetic acid, tetraethylene pentamine hexaacetic acid, etc., to create a reducing system in which a large variety of organic reductions can be carried out.

Thus, for example, it is common in organic systems to require an oxygen scavenger to take up free oxygen and to do so with a compound which leads to minimum contamination of that system. To develop a reduction, it is possible to take the bivalent tin chelate of ethylene diamine tetraacetic acid in an acidic solution, or the sodium salt of the bivalent tin chelate of ethylene diamine tetraacetic acid in water solution, and to oxidize the tin to the tetravalent tin in water itself with the production of hydrogen gas. The equation may be written as follows:

$$H_2SnEDTA + 2H_2O \rightarrow H_2 + H_2Sn(OH)_2EDTA$$

Where it is desired to carry out an organic reduction such as the reduction of an organic acid chloride, it can be carried out as follows:

$$H_2SnEDTA + RCOCl + 2H_2O \rightarrow RCHO + HCl + H_2Sn(OH)_2EDTA$$

Other hydrogenation reactions wherein a strong reduction potential is desired can be accomplished in the same fashion. With these chelates we have reagents which can act in different forms. For instance, Sn(II)$_2$EDTA has a very low solubility in water and gives an acidic reaction. Therefore, it is useful as a reducing agent where acidic conditions are required and where a heterogenous reaction is desired which avoids a subsequent separation of the tin chelate from the soluble reaction product. Na$_2$Sn(II) EDTA on the other hand is water soluble and has a neutral or basic reaction, in other words it can be used in basic aqueous solutions.

It will be seen that the ethylene diamine tetraacetic acid moiety is expanded into diethylene triamine pentaacetic acid, triethylene tetraamine hexaacetic acid and those multiples of the fundamental amine in which the ethanol or the β-hydroxy ethyl group replaces one, or two acetic acid moieties on different nitrogens. These same compounds are useful where they are formed on the propylene or tetramethylene spacer nucleus and, further, when they are formed as the propionic acid derivatives. These are virtually truisms because generally the objective is to form the complex fused ring in which the metal is part of the ring and is coordinately united in the ring. It is important that this spaced nitrogen effect be maintained and in forming tin salts in accordance with the invention for use as reducing agents herein, it is an important aspect of the compound that it carry a large proportion of the bivalent tin. It is the bivalent tin ion that serves as a water reducing agent.

The following are examples of reductions:

Example I

Methylene blue in aqueous solution is reduced to the colorless base by $H_2Sn(II)_2$ EDTA fairly fast on heating. $Na_2Sn(II)$ EDTA, however, reduces methylene blue in water and upon heating extremely slowly. This reduction is reversible since treatment with oxygen or $H_2O_2$ restores the original blue color.

Example II $H_2Sn(II)_2$ EDTA and $Na_2Sn(II)$ EDTA both reduce psoralen quinone, (see I) to psoralen quinol, (see II) in ethanol or ethanol water mixtures or water. Customarily, $SO_2$ is used for this reduction.

Example III $H_2Sn(II)_2$ EDTA reduces indigo only in acidic aqueous solution. No reduction takes place in neutral aqueous solution.

Example IV

Nitrobenzene is not reduced by $Na_2Sn(II)$ EDTA, instead, if a mixture of water and nitrobenzene is subjected to this reducing agent, the water is being reduced and not the nitrobenzene.

The experiments described in the examples herein are merely exemplary of the operations which can be carried on. Briefly, it should be noted that if it is desirable to operate with a solid reducing agent, the acid form of the tin chelate in the acid medium is quite effective. Where it is an alkaline medium which is to be used, the sodium salt form of the tin chelate is useful and the reduction is thus accomplished in the alkaline medium. Likewise, it is possible to use the calcium salt of the tin chelate. It is important to note only that the half-wave potentials available give the operator a good quantitative estimate of the reducing potential which can be applied to a given system wherein the tin chelate and water can serve.

In following any reduction carried out using the tin chelate, the reduction of water by the tin EDTA chelate can be followed by observation of the tin-II concentration remaining in solution during the progress of the reaction.

Reduction of water by tin-EDTA complexes express the rate of reaction in terms of tin (II) concentrations left in solution as against time at different pH values.

From the examples given and the curves, it will be apparent that a wide variety of organic reductions can be carried out in the medium, whether the structure be an organic quinone, an organic compound, or an unsaturated oil which would be hydrogenated. The remaining factor shows the extent to which the reduction of the water can be accomplished.

Though the invention has been described in terms of a few examples, variations thereof can be practiced without departing from its spirit or scope.

What is claimed is:

1. A reducing acid aqueous medium in which organic reduction reactions can be carried out with heating which consists essentially of a reaction medium of a solution of water and a bivalent tin chelate reactable with water to generate hydrogen said bivalent tin chelate being in acid form of a compound corresponding to one of the following $$\begin{array}{c} HO-\overset{O}{\underset{\|}{C}}-CH_2 \\ \diagdown \\ NR \\ \diagup \\ HO-\overset{O}{\underset{\|}{O}}-CH_2 \end{array}$$

wherein R is selected from the group consisting of H and $$-\left[(CH_2CH_2)-\underset{\underset{CH_2COOH}{|}}{N}-\right]_x CH_2COOH$$

wherein $x$ is an integer having a value in the range 0, 1, 2 and 3.

2. A medium in accordance with claim 1 wherein the pH is maintained in a range with 2.2 to 8.

3. A medium in accordance with claim 2 wherein the reducing agent is the stannous chelate of a compound selected from the group consisting of imino diacetic acid, nitrilo triacetic acid, lower alkyl N-substituted imino diacetic acid, ethylene diamine tetraacetic acid, diethylene triamine pentaacetic acid, tetraethylene pentamine hexaacetic acid.

4. A medium in accordance with claim 1 wherein the reducing agent is the tin (II) chelate of ethylene diamine tetraacetic acid.

5. A medium in accordance with claim 1 wherein the reducing agent is the tin-II chelate of imino diacetic acid.

6. A medium in accordance with claim 2 wherein the reducing agent is the tin-II chelate of imino diacetic acid.

7. A medium in accordance with claim 1 wherein the chelating agent is nitrilo triacetic acid.

References Cited

UNITED STATES PATENTS

| 3,078,289 | 2/1963 | Rowland et al. | 260—429.7 |
| 3,152,155 | 10/1964 | Langer | 260—429.7 |

FOREIGN PATENTS

| 922,385 | 3/1963 | Great Britain. |

OTHER REFERENCES

Oster, G.: J. Am. Chem. Soc., vol. 79, pp. 4836–38, (1957).

Smith, T. O.: J. Chem. Soc., pp. 2554–57 (1961).

LEON D. ROSDOL, Primary Examiner.

I. GLUCK, Assistant Examiner.

U.S. Cl. X.R.

23—214; 252—105, 178, 431